UNITED STATES PATENT OFFICE.

WILLIAM HENDERSON, OF GLASGOW, SCOTLAND.

IMPROVEMENT IN THE MANUFACTURE OF WROUGHT-IRON AND STEEL DIRECT FROM THE ORE.

Specification forming part of Letters Patent No. 60,002, dated November 27, 1866.

*To all whom it may concern:*

Be it known that I, WILLIAM HENDERSON, of Glasgow, Scotland, have invented a new and useful Method of Manufacturing Wrought-Iron and Steel Direct from the Ores of Iron, of which the following is a specification:

Many attempts have been made to produce iron and steel direct from the ores of iron in the ordinary puddling-furnace, or in retorts or reducing-chambers, and afterward by an ordinary reverberatory furnace. These attempts have hitherto failed to produce satisfactory or even uniform results.

In reducing iron ores either to wrought-iron or steel all pass through the first stage of malleable, spongy iron, which is produced at a comparatively low heat. In this state the iron is extremely liable to oxidize or burn if exposed to currents of air, or currents having an excess of oxygen; and as iron requires a very high heat to agglomerate the particles of reduced iron sufficiently to weld them into a solid mass under the hammer, and steel requires a still higher heat to melt it, and as it has been found impossible to obtain an intense heat in the common reverberatory furnace without a corresponding intensity of draft, in attempting to obtain the necessary heat the reduced sponge burns, and forms large quantities of oxide, which slags and rapidly destroys the furnace-coating, and further oxidizing the reduced metal. Results are therefore uncertain, and neither the yield nor the quality can be relied on, as all depends upon the firing, the state of the grate, and the tightness of the furnace. I therefore employ, for all the purposes of reduction and melting, a reducing-flame obtained from gas and heated air.

Gas-furnaces can be worked with a small amount of draft, and any degree of heat required for these operations can be easily obtained, with, indeed, a pressure of gas inside them. They also possess the additional advantage of affording complete and instant control over the quantity of the flame.

The most economical furnace of this description with which I am acquainted is Siemens' gas-regenerative furnace—the gas being from coal, shale, wood, shale oil, or petroleum. By means of this furnace and my improved solid-carbon bottom all excessive oxidation is prevented, and wrought-iron or steel is produced from pure hematite and spathic ores, regular in quality and quantity.

I form the bottom of my furnaces of a mixture of hard, well-burned coke and coal-tar ground together in a mortar-mill. The coke is ground first to the state of a coarse powder, and the tar is added until the mixture is about the consistence of stiff mortar. It is put into a heap in a warm, dry place, and in a few days it will get firmer and drier. It is then built up in layers on the sole-plate of the furnace, and hammered with a wooden mallet as hard and firm as possible into the shape of bottom required. It should, in every case, be eighteen inches thick, at least, and the sole or bed-plates of the furnace should be placed in as near as possible the ultimate shape of the surface of the bottom required.

For a furnace required to produce only wrought-iron, I prefer that the bed should be five feet long clear of the bridges and four feet six inches broad. This will reduce at a charge six hundred-weight of iron ore, and produce, according to the purity of the ore, from three and a half hundred-weight to four and a half hundred-weight of iron of very superior quality per charge.

For cast-steel I prefer a much larger furnace, because the reduced metal is melted, not balled, and does not require the manual labor necessary to gather and agglomerate the particles of wrought-iron and drag them out of the furnace and to the hammer or squeezers, the metal in this case being reduced and melted and tapped into a ladle which gives delivery of its metal into the molds from the bottom in the usual manner.

A furnace twelve feet between the bridges and five feet wide inside will take a ton of ore per charge, and produce from ten to thirteen hundred-weight of cast-steel per charge, according to the quality of the ore operated upon.

When it is considered that every equivalent of silica contained in the ores combines with three equivalents of protoxide of iron, and forms a slag which is very destructive to the furnaces, and very much interferes with the action of the carbonaceous matter in the process of reduction, it will be seen how important it is to have ores as free as practicable from silica for the purpose of direct reduction. Indeed, I have found by experience that ores containing upward of six per cent. of silica waste so much iron and give such irregular and unsatisfactory results as practically to be of small value for the purposes of this invention.

To produce wrought-iron direct from the purer oxide of iron ores like hematite, I proceed as follows: The ore must first be crushed to pass through an eighth of an inch sieve one hundred parts of dry ore and twenty-two parts of wood charcoal, two parts of common salt, and a variable proportion of lime, according to the proportion of silica, and in the proportion of one part of lime to one part of silica. If the ore shows by analysis that it contains sulphur and no manganese, I add also as much oxide of manganese as will be equal to twice the proportion of sulphur, or I add an iron ore containing an excess of manganese, to bring the proportions to the point indicated. When these proportions have been adjusted I prefer to grind the whole mixture together, so as to insure a proper and uniform mixture of all the ingredients. I take ten hundred-weight of this mixture and place it on the carbon bottom of the gas-furnace, which has been previously heated to strong white heat by melting a portion of slag on it, and then tapping it out. The charge of ten hundred-weight of mixture, already described, is then charged into the furnace, and the full heat of the flame, with just sufficient draft to take the flame in at the door, and no more. It is safer, indeed, to have a portion of the flame escaping by the door. The charge must be constantly raked and turned over, so as uniformly and regularly to heat every portion of it until it has become heated uniformly to a very bright-red heat, approaching whiteness. It must not, however, at this stage be allowed to soften. A strong reducing-flame is then brought to play over the heated mixture for about two hours, with the doors of the furnace closed. By this time all the particles of metal will have been reduced. The door is then raised and the reduced ore gathered into balls. If any particles of charcoal still remain the draft of the furnace should be increased, and more heated air admitted, which will quickly burn out any excess of carbon, and make the reduced metal slag a little, which is beneficial, as it facilitates the balling and cleanses the iron, making it weld and hammer better. This must not, however, be carried too far, as it results in a considerable loss of metal unnecessarily. The reduced iron is gathered together as in the usual puddling process, hammered, and rolled in the usual manner.

Twenty-six per cent. of pure anthracite coal free from sulphur, and as free as may be from ash, or twenty-seven and a half per cent. of pure bituminous coal, may be substituted for the twenty-two per cent. of charcoal, and will produce corresponding results; but charcoal yields more metal, and of a finer quality.

To produce cast-steel direct from these oxide ores of iron, I employ the same mixture, increasing the charcoal, however, to twenty-five per cent. and the oxides of manganese to five per cent. The mixture is worked in the furnace exactly as has been described for wrought-iron up to the point when the whole mass has reached a uniform bright-red heat. To produce steel it is necessary to maintain this heat for at least two hours, gradually increasing it after that time, and occasionally stirring it well up to maintain a uniform heat throughout the mass. The heat is still further increased until the charge begins to melt; the gas is then turned full on, a little more air admitted, still, however, maintaining a reducing-flame. The doors are luted up, and the furnace brought to its full heat. The charge, as soon as melted, is tapped into a ladle with a plug in the bottom, and the metal is from thence run into cast-iron molds, in the usual manner. As soon as one charge is withdrawn from the furnace another is added.

I claim as my invention and desire to secure by Letters Patent—

1. The several improved processes hereinbefore described for manufacturing wrought-iron and steel direct from the ores of iron.

2. The formation of the bottom of the furnace to be used in the working of the above-described processes with the materials and in the manner hereinbefore described.

WM. HENDERSON.

Witnesses:
WILLIAM McIVOR,
of 45 West George street, Glasgow, clerk-at-law.
ROBERT McGOWAN,
of 45 West George street, Glasgow, clerk-at-law.